United States Patent [19]

Wang

[11] 3,907,765

[45] Sept. 23, 1975

[54] PROCESS FOR PREPARING OCTAPEPTIDE INTERMEDIATE FOR HUMAN INSULIN AND INTERMEDIATES

[75] Inventor: Su-Sun Wang, Bloomfield, N.J.

[73] Assignee: Hoffmann-La Roche Inc., Nutley, N.J.

[22] Filed: June 29, 1973

[21] Appl. No.: 375,200

[52] U.S. Cl............................ 260/112.5; 260/112.7
[51] Int. Cl.$^2$................. C07C 103/52; A61K 37/26
[58] Field of Search...................... 260/112.5, 112.7

[56] References Cited
UNITED STATES PATENTS
3,276,961  10/1966  Bodanszky et al............... 260/112.7

OTHER PUBLICATIONS

Bodanszky and Ondetti, "Peptide Synthesis", Interscience, New York, 1966, p. 54.
Ruttenberg: Science, 177, 623–626 (1972).
Merrifield: Adv. in Enzymology, 32, 249–250 (1969).
Pettit, G. R., "Synthetic Peptides," Vol. 1, Reinhold Co., N.Y., 1970, pp. 148, 330.
Wolman, "Chemistry of the Amino Group," S. Patai, ed., Interscience Pub., N.Y., 1968, pp. 682, 685–686.
Katsoyannis et al., J. Am. Chem. Soc., 85, 2659–2662 (1963).
Prout, Metabolism, 12, 673–675 (1963).
Merrifield, Adv. in Enzymology, 32, 249 (1969).

Primary Examiner—Lewis Gotts
Assistant Examiner—Reginald J. Suyat
Attorney, Agent, or Firm—Samuel L. Welt; Jon S. Saxe; George M. Gould

[57] ABSTRACT

Semi-synthetic human insulin can be prepared by removing the B-chain C-terminal octapeptide from porcine insulin by trypsin hydrolysis followed by addition of the synthetic human insulin B-chain C-terminal octapeptide. The present disclosure relates to an improved process for preparing the precursor intermediate to the known synthetic human insulin octapeptide and to novel intermediates involved therein. This process uses a protected phenylalanine as the precursor for the protected tripeptide Z—Gly—Phe—Phe which is then condensed with the protected dipeptide HCL.Tyr(OBzl)—Thr—OCH$_3$ to form the novel intermediate protected pentapeptide Z—Gly—Phe—Phe—Tyr—(OBzl)—Thr—OCH$_3$. The pentapeptide is then converted to the hydrazide and coupled via azide coupling to the protected tripeptide HCl.Pro—Lys(Boc)—Thr—OCH$_3$ to yield the novel protected octapeptide Z—Gly—Phe—Phe—Tyr(OBzl)—Thr—Pro—Lys(Boc)—Thr—OCH$_3$.

The latter compound is converted to the known synthetic human insulin octapeptide derivative Gly—Phe—Phe—Tyr—Thr—Pro—Lys(Boc)—Thr—OCH$_3$ by hydrogenolysis.

8 Claims, No Drawings

PROCESS FOR PREPARING OCTAPEPTIDE INTERMEDIATE FOR HUMAN INSULIN AND INTERMEDIATES

BACKGROUND OF THE INVENTION

Ruttenburg (Science, 177, 623 [1972]) has described a method for the semisynthetic preparation of human insulin by selective enzymatic removal of the B-chain C-terminal octapeptide of porcine insulin followed by condensation of synthetic human insulin B-chain C-terminal octapeptide. In this manner a ready source of human insulin has become available since human insulin cannot readily be synthesized en toto at reasonable cost and porcine insulin is available in reasonable amounts and cost. The use of porcine insulin in the treatment of diabetes in humans produces immunologic intolerance in many patients after a period of time even though the porcine insulin differs from human insulin in the identity of only one amino acid located in the aforesaid B-chain C-terminal octapeptide.

The present invention provides a facile route for the preparation of the precursor to the synthetic human insulin octapeptide utilizing readily available starting materials and relatively high yield process steps with freedom from racemization of the amino acids employed.

DESCRIPTION OF THE INVENTION

The present invention can be described as a three-stage method for the preparation of human insulin B-chain C-terminal octapeptide and includes a number of novel protected polypeptides used as intermediates.

The first stage of the method of the present invention involves the synthesis of the known protected tripeptide Z—Gly—Phe—Phe by an improved process starting from the protected amino acid Boc—Phe—OSu. This process represents an improvement in the synthesis of Z—Gly—Phe—Phe in that the reaction sequence employed minimizes the risk of racemization of the amino acids. Since the optical purity of the final product octapeptide is of high importance to its pharmaceutical properties as part of the final human insulin, this feature of this process aspect of the present invention is correspondingly important.

The first step of the first stage of the present method involves reacting phenylalanine with Boc—Phe—OSu in a polar non-protic solvent, such as dimethylformamide, dimethylacetamide, hexamethylphosphoramide, dimethylsulfoxide, N-methyl-2-pyrrolidone and the like, in the presence of an organic base such as 1,1,3,3-tetramethylguanidine, tri-$C_{1-7}$ lower alkylamine such as triethylamine, or diisopropylethylamine, N-$C_{1-7}$ lower alkylmorpholine such as N-methyl morpholine or N-ethyl morpholine or N-phenyl $C_{1-7}$ lower alkyl tri $C_{1-7}$ lower alkylammonium hydroxide such as N-benzyl-trimethylammonium hydroxide and the like. The aforesaid reaction can be conducted at a temperature in the range of from about −10° to 40°C., most preferably at about room temperature. Conventional procedures are employed in isolating the desired product Boc-Phe-Phe from the reaction medium.

In the next process step of stage one, the above protected dipeptide is treated with trifluoroacetic acid to remove the protecting group and the free dipeptide then is reacted with the protected amino acid, Z—Gly—OSu or Z—Gly—ONP in a polar non-protic solvent such as dimethylformamide or the like in the presence of a tri-$C_{1-7}$ lower alkylamine such as triethylamine for a period of from about 2 to 80 hours. The reaction temperature is not narrowly critical and most conveniently will be at room temperature. Product Z—Gly—Phe—Phe can be recovered from the reaction medium by conventional techniques such as by extraction with a water immiscible organic solvent followed by concentration of the solvent.

In the second stage of the instant method the novel protected dipeptide Boc—Tyr(Bzl)—Thr—OCH$_3$ is prepared by reacting the protected amino acids Boc—Tyr(Bzl) with Thr—OCH$_3$ in the presence of a condensing agent such as carbodiimides, e.g., dicyclohexylcarbodiimide; N-ethoxycarbonyl-2-ethoxy-1,2-dihydroquinoline; triphenylphosine plus 2,2'-dipyridyl disulfide; 2-ethyl-5-(3-sulfophenyl)-1,2-oxazolebetaine and the like. The reaction is preferably conducted with cooling at a temperature in the range of from about −10° to 25°C., most preferably at about 0°C. A suitable inert solvent such as a halogenated hydrocarbon, for example, dichloromethane or chloroform; a cyclic ether such as dioxane or tetrahydrofuran or a polar, non-protic solvent such as dimethylformamide and the like may be employed.

The resulting aforesaid protected dipeptide is then treated with aqueous HCl in a cyclic ether solvent such as tetrahydrofuran at room temperature to unblock the terminal amino group thereby producing the novel dipeptide Tyr(Bzl)—Thr—OCH$_3$ as the hydrochloride salt.

In the final step of stage 2, the above dipeptide methyl ester preferably as the hydrochloride is reacted with the aforesaid tripeptide Z—Gly—Phe—Phe to yield the novel pentapeptide intermediate Z—Gly—Phe—Phe—Tyr(Bzl)—Thr—OCH$_3$. This reaction is conducted in the presence of a complex condensing agent consisting of N-methyl morpholine, 1-hydroxybenzotriazole and dicyclohexylcarbodiimide. A polar non-protic solvent such as dimethylformamide may be utilized. This condensation reaction can be carried out with cooling at a temperature in the range of from about −15° to 40°C., most preferably in the range of from about −10° to 25°C. The low temperature reaction is terminated after about 1 to 6 hours, preferably about 4 hours and the reaction mixture allowed to stand for about 10 to 72 hours, e.g., 48 hours at room temperature. Isolation of the final product is conventional.

The third stage of the present method involves conversion of the above pentapeptide into the desired human insulin octapeptide. In the first process step of stage 3, the aforesaid pentapeptide methyl ester is converted into the corresponding hydrazide by reaction of the former compound with anhydrous hydrazine in a polar, non-aprotic solvent such as dimethylformamide at a temperature in the range of from about 0° to 40°C., preferably from about 20° to 25°C. After 1 to 4 hours at the lower temperatures the reaction is allowed to stand at room temperature for about 24 hours. The novel product Z—Gly—Phe—Phe—Tyr(Bzl)—Thr—HNNH$_2$ is purified in a conventional manner.

The resulting pentapeptide hydrazide is then coupled with the tripeptide HCl.Pro—Lys(Boc)—Thr—OCH$_3$ using the azide method. In this procedure the aforesaid hydrazide is first treated with HCl dissolved in an organic solvent such as tetrahydrofurane, dioxane, ethyl acetate or the like and a solution of a $C_{1-7}$ lower alkyl nitrite, such as isoamyl nitrite in a polar-non-protic solvent such as dimethylformamide. This procedure is carried out at a temperature in the range of about −25° to −15°C. After further cooling to a temperature in the range of about −35° to −25°C., a tri-$C_{1-7}$ lower alkylamine such as triethylamine, is added to the reaction medium followed by addition of the tripeptide. The reaction mixture is stirred at a temperature of about −20°C. for approximately 30 minutes and then at about 0°C. for 24 to 72 hours to complete the reaction. Conventional isolation procedure yielded the novel octapeptide intermediate Z—Gly—Phe—Phe—Tyr(Bzl)—Thr—Pro—Lys(Boc)—Thr—$OCH_3$.

Hydrogenation of the aforesaid octapeptide compound utilizing a noble metal catalyst such as palladium, preferably supported on a conventional catalyst support material such as charcoal or barium sulfate at a temperature in the range of from about 10° to 30°C. with a hydrogen pressure in the range of about 30 to 60 psi gives the desired octapeptide $NH_2$—Gly—Phe—Phe—Tyr—Thr—Pro—Lys(Boc)—Thr—$OCH_3$. This compound is the carboxyl terminal sequence of human insulin B-chain and was utilized by Ruttenburg, supra, in the preparation of human insulin by condensation with di-Boc-desoctapeptide insulin pentamethyl ester followed by removal of protective groups.

As used herein the following terms and abbreviations have the indicated meanings:

Z = carbobenzoxy
Boc = t-butyloxycarbonyl
Bzl = benzyl
OSu = N-hydroxysuccinamide ester
ONP = p-nitrophenyl ester
$OCH_3$ = methyl ester
Phe = phenylalanine
Thr = threonine
Tyr = tyrosine
Gly = glycine
Pro = proline
THF = tetrahydrofuran
DMF = dimethylformamide
DCC = dicyclohexylcarbodiimide All amino acids having a center of chirality have the natural or L configuration.

The present invention will be more clearly understood by reference to the following examples wherein all temperatures are in degrees Centigrade.

EXAMPLE 1

Boc—Phe—Phe

L-Phenylalanine (13.2 g.) was ground in a motor and pestle and suspended in 250 ml. of DMF. To the mixture was then added 9.5 g. of 1,1,3,3-tetramethylquanidine and 29 g. of Boc-L-Phe-OSu. The mixture was stirred gently for 24 hours when most of the solid disappeared. After filtration to remove small amount of insoluble matters, the solution was partitioned between 800 ml. of ethyl acetate and 600 ml. of 2 percent citric acid. The organic layer was washed once with 2 percent citric acid and then three times with water. Upon drying and removal of the solvent at 30°, the oil remained started to solidify shortly. Recrystallization from ethyl acetate and petroleum ether afforded 17.5 g. (53%) of t-butyloxycarbonyl-L-phenylalanyl-L-phenylalanine melting at 145°–146°. $[\alpha]_D^{25} = -2.67$ (c=0.94, MeOH).

Anal. Calcd. for $C_{23}H_{28}N_2O_5$ (412.5): C, 66.98; H, 6.84; N, 6.79 Found: C, 66.93; H, 6.81; N, 6.79.

EXAMPLE 2

Z—Gly—Phe—Phe

The above protected dipeptide (Boc—L—Phe—L—Phe, 12.5 g.) was dissolved in 120 ml. of TFA and left standing for 15 minutes with occasional shaking to facilitate the evolution of $CO_2$ gas. The acid was quickly evaporated off at 30° and the residue treated with large volume of ether whereupon the free dipeptide precipitate as white solid. It was filtered and washed with ether to give 15.5 g. of material which was then dissolved in 110 ml. of DMF and reacted with 9.5 g. of Z—Gly—OSu in the presence of 6.5 ml. triethylamine for 24 hours. The reaction mixture was then shaken with a mixture of 700 ml. 0.5N HCl and 1000 ml. ethyl acetate and the organic layer was washed three times with water, dried over $Na_2SO_4$ and concentrated to about 150 ml. when some crystalline product started to appear, On storage in the refrigerator overnight, 15 g. of benzyloxycarbonyl-glycyl-L-phenylalanyl-L-phenylalanine melting at 177°–180° was obtained. Recrystallization from hot ethyl acetate elevated the m.p. to 180°–182°. Yield, 12.2 g. (80%). $[\alpha]_D^{25} = +16.74°$ (c=0.96, HOAc).

Anal. Calcd. for $C_{28}H_{29}N_3O_6$ (503.6) : C, 66.79; H, 5.81; N, 8.34. Found C, 66.72; H, 5.69; N, 8.34.

The compound was also prepared by utilization of Z—Gly—ONP instead of Z—Gly—OSu with slightly lower yield (72%).

EXAMPLE 3

Boc—Tyr(Bzl)—Thr—$OCH_3$

Boc—L—Tyr(Bzl) (15.8 g.) was dissolved in 160 ml. of icecold $CH_2Cl_2$ when 5.67 g. of L—Thr—$OCH_3$ was added followed by 9.65 g. of DCC. The reaction mixture was stirred at 0° for 1 hour and then at room temperature for 2 hours. The insoluble byproduct was filtered off and the filtrate evaporated at 35° to syrup. It was taken up in 200 ml. of ethyl acetate, filtered to remove more dicyclohexylurea and evaporated to a light yellowish oil. The compound crystallized slowly when submerged in petroleum ether for approximately 10 days. Recrystallization from THF and petroleum ether gave 17.2 g. (83%) of N-t-butyloxycarbonyl-O-benzyl-L-tyrosyl-L-threonine methyl ester melting at 110°–112°. $[\alpha]_D^{25} = -2.72°$ (c=1, MeOH).

Anal. Calcd. for $C_{26}H_{34}N_2O_7$ (486.6) : C, 64.18; H, 7.04; N, 5.76. Found: C, 64.60; H, 7.08; N, 5.71.

EXAMPLE 4

Tyr(Bzl)—Thr—$OCH_3$.HCl

The above compound (Boc—Tyr(Bzl)—Thr—$OCH_3$, 11.4 g.) was dissolved in freshly prepared 2.6N HCl in THF. After standing for 90 minutes with occasional shaking to facilitate $CO_2$ evolution, the solid product accumulated was collected by suction and washed with ether to give 7.7 g. of material melting at 225°–227°. It was recrystallized from methanol and ether. Yield, 7.0 g. (71%). m.p. 232°–234°. $[\alpha]_D^{25} = +2.09°$ (c=1.0, MeOH).

Anal. Calcd. for $C_{21}H_{26}N_2O_5$.HCl (422.9) : C, 59.64; H, 6.44; N, 6.62 Found: C, 59.43; H, 6.40; N, 6.54.

EXAMPLE 5

Z—Gly—Phe—Phe—Tyr(Bzl)—Thr—$OCH_3$

The dipeptide hydrochloride (Tyr(Bzl)—

Thr—OCH$_3$.HCl, 6.25 g.) was dissolved in 120 ml. of DMF together with 7.43 g. of Z—Gly—Phe—Phe. The mixture was cooled to −10° in an ice-salt bath and reacted with 1.66 ml. of N-methyl-morpholine, 4.0 g. of 1-hydroxybenzotriazole and 3.7 g. of DCC. It was stirred at the same temperature for four hours and then 48 hours at room temperature. The insoluble byproduct formed was filtered off and the filtrate evaporated to syrup with oil pump at temperature not exceeding 40°. Upon trituration with ethyl acetate 11 g. of white solid was obtained. It was dissolved in 700 ml. of hot methanol and left standing on the bench to cool down slowly overnight to give 8.5 g. (66%) of crystalline benzyloxycarbonyl-glycyl-L-Phenylalanine-L-phenylalanyl-O-benzyl-L-tryrosyl-L-threonine methyl ester melting at 181°–184°. $[\alpha]_D^{25} = -16.58°$ (c=1, DMF).

Anal. Calc. for C$_{49}$H$_{53}$N$_5$O$_{10}$ (871.99); C, 67.49; H, 6.13; N, 8.03. Found: C, 66.97; H, 6.11; N, 8.03.

EXAMPLE 6

Z—Gly—Phe—Phe—Tyr(Bzl)—Thr—HNNH$_2$

The above compound (Z—Gly—Phe—Phe—Tyr(Bzl)—Thr—OCH$_3$, 8.5 g.) was dissolved in 120 ml. of DMF cooled in an ice-bath. To this solution, 20 ml. of anhydrous hydrazine was added and the reaction mixture stirred gently at 0° for 1 hour and then 24 hours at room temperature. Upon dilution with 1500 ml. of methanol the product started to precipitate slowly. After storage in the refrigerator overnight 7.6 g. of material with m.p. 241°–243° was obtained. It was dissolved in 115 ml. of DMF, filtered and treated with 250 ml. of methanol. Crystalline product formed during overnight standing on the bench. Yield of benzyloxycarbonyl-glycyl-L-phenylalanyl-L-phenylalanyl-O-benzyl-L-tyrosyl-L-threonyl hydrazide hydrate 6.8 g. (78%). m.p. 241°–243°. $[\alpha]_D^{25} = -16.73°$ (c=1, DMF). nmr spectrum agreed with the structure.

Anal. Calcd for C$_{48}$H$_{53}$N$_7$O$_9$.H$_2$O (888.0) : C, 65.01; H, 6.23; N, 11.04. Found: C, 64.96; H, 6.19; N, 11.09.

EXAMPLE 7

Z—Gly—Phe—Phe—Tyr(Bzl)—Thr—Pro—Lys(Boc)—Thr—OCH$_3$

Z—Gly—Phe—Phe—Tyr(Bzl)—Thr—HNNH$_2$ (1.65 g.) was dissolved in 30 ml. of DMF and cooled at −25° when 3.35 ml. of 3.4N HCL (THF) and 3.65 ml. of 10 percent i-amylnitrite (DMF) were added. The mixture was stirred gently for 30 minutes at −20° and then cooled to −30° when 1.87 ml. of triethylamine was added followed by 1.0 g. of HCl.Pro—Lys(Boc)—Thr—OCH$_3$ that was freshly prepared from Z—Pro—Lys(Boc)—Thr—OCH$_3$ by hydrogenation (1 eq. HCl; 5% Pd-BaSO$_4$ catalyst). The mixture was then stirred gently for 90 minutes at −20° and 66 hours at 0° during which time a few drops of triethylamine had to be added from time to time in order to maintain the pH slightly basic to the moister pH paper. After filtration to remove the insoluble by-product, the solution was evaporated at 45° and the yellowish oil left was treated with ether resulting in the formation of 3.25 g. white powder. It was dissolved in 70 ml. of THF, filtered to remove some more salt and evaporated to a solid mass. Dissolved in 65 ml. of hot i-PrOH and stored in the refrigerator overnight. A white amorphous granular mass formed was collected by suction and washed with ether. Yield, 1.92 g. (78%). Single spot on tlc. $[\alpha]_D^{25} = -30.62°$ (c=1.0, DMF). nmr spectrum agreed with the structure.

Anal. Calcd. for C$_{69}$H$_{87}$N$_9$O$_{16}$ (1298.5); C, 63.82; H, 6.75; N, 9.71; OCH$_3$, 2.39. Found: C, 63.52; H, 6.91; N, 9.68; OCH$_3$, 2.76.

Amino Acid anal. Thr, 2.06; Pro, 0.96; Gly, 1.08; Tyr, 0.83; Phe, 2.07; Lys, 0.99.

EXAMPLE 8

H$_2$N—Gly—Phe—Phe—Tyr—Thr—Pro—Lys(Boc)—Thr—OCH$_3$.HCL

Z—Gly—Phe—Phe—Tyr(Bzl)—Thr—Pro—Lys(Boc)—Thr—OCH$_3$ (1.30 g.) was dissolved in a mixture of 100 ml. MeOH, 20 ml. THF, 13 ml. H$_2$O and 1.2 ml. 1N HCl and hydrogenated at 50 psi for 18 hours in the presence of 0.5 g. catalyst (5% Pd on BaSO$_4$). The catalyst was removed by filtration and washed a few times with small volumes of MeOH. The combined filtrate and washings was evaporated to a colorless solid which was taken up in 80 ml. of water, filtered to remove some small insoluble matters and lyophilized to give 0.956 g. of white powder $[\alpha]_D^{25} = +41.61°$ (c = 1.0, MeOH). nmr spectrum agreed with the structure.

Anal. calcd. for C$_{54}$H$_{76}$N$_9$O$_{14}$Cl (1110.68) ; C, 58.40; H, 6.90; N, 11.35; OCH$_3$, 2.79. Found: C, 58.35; H, 6.92; N, 11.33; OCH$_3$, 3.14.

I claim:

1. N-α-t-butyloxycarbonyl-O-benzyl-L-tyrosyl-L-threonine methyl ester.

2. O-Benzyl-L-tyrosyl-L-threonine methyl ester.

3. An improved process for the preparation of the tripeptide Z—Gly—Phe—Phe without racemization of the reactants or intermediates which process comprises:

A. reacting phenylalanine with Boc—Phe—OSu in a polar, non-protic solvent in the presence of an organic base so as to product Boc—Phe—Phe;

B. treating the said Boc—Phe—Phe produced in step A. above with trifluoroacetic acid to remove the Boc protecting group; and, C. reacting the resulting free dipeptide with a protected glycine selected from the group consisting of Z—Gly—OSu and Z—Gly—ONP in a polar, non-protic solvent in the presence of a tri-C$_{1-7}$ lower alkylamine to produce the desired Z—Gly—Phe—Phe.

4. The process of claim 3 wherein said polar, non-protic solvent in steps A and C is dimethylformamide and said organic base in step A. is 1,1,3,3-tetramethyl-guanidine.

5. The process of claim 3 wherein said protected glycine in step C is Z—Gly—OSu and said tri-C$_{1-7}$ lower alkylamine is triethylamine.

6. An improved process for the preparation of the human insulin octapeptide derivative NH$_2$—Gly—Phe—Phe—Tyr—Thr—Pro—Lys(Boc)—Thr—OCH$_3$ which process comprises in combination:

A. reacting the dipeptide Tyr(Bzl)—Thr—OCH$_3$ with the tripeptide Z—Gly—Phe—Phe in the presence of a complex condensing agent comprising N-methyl morpholine, 1-hydroxybenzotriazole and dicyclohexylcarbodiimide to produce the pentapeptide Z—Gly—Phe—Phe—Tyr(Bzl)—Thr—OCH$_3$;

B. converting the pentapeptide produced in step A. into the corresponding hydrazide by reacting said pentapeptide with anhydrous hydrazine;

C. reacting said pentapeptide hydrazide from step B. with a $C_{1-7}$ lower alkyl nitrite in the presence of HCl dissolved in an organic solvent, followed by treatment with a tri-$C_{1-7}$ lower alkylamine and then reaction with the tripeptide HCl.Pro—Lys(Boc)—Thr—OCH$_3$ to produce the octapeptide NH$_2$—Gly—Phe—Phe—Tyr(Bzl)—Thr—Pro—Lys(Boc)—Thr—OCH$_3$; and, D. hydrogenating the octapeptide of step C. using a supported noble metal catalyst so as to produce the desired NH$_2$—Gly—Phe—Phe—Tyr—Thr—Pro—Lys(Boc)—Thr—OCH$_3$.

7. The process of claim 6 wherein said lower alkyl nitrite in step C. is iso-amyl nitrite and said tri-$C_{1-7}$ lower alkylamine is triethylamine.

8. The process of claim 6 wherein said supported noble metal catalyst in step D is palladium on barium sulfate.

* * * * *